United States Patent [19]

Widdowson

[11] 4,433,321
[45] Feb. 21, 1984

[54] PRESSURE TRANSDUCER

[75] Inventor: Richard E. Widdowson, Dayton, Ohio

[73] Assignee: General Motors Corporation, Detroit, Mich.

[21] Appl. No.: 418,201

[22] Filed: Sep. 15, 1982

[51] Int. Cl.³ .............................................. H01L 10/10
[52] U.S. Cl. ....................................... 338/42; 338/36
[58] Field of Search ................. 338/36, 39, 42; 73/25, 73/26

[56] References Cited
U.S. PATENT DOCUMENTS 3,069,645  12/1962  Henke ................................... 338/39

*Primary Examiner*—C. L. Albritton
*Attorney, Agent, or Firm*—R. L. Phillips

[57] ABSTRACT

A pressure transducer is disclosed having a potentiometer including a resistor and relatively movable conductive wiper and a pressure sensor responsive to a variable pressure signal to move the wiper along the resistor so as to convert the variable pressure signal into a variable voltage signal. The resistor is mounted in conductive relationship in the potentiometer and so as to be slidably adjustable external to the transducer and relative to the wiper to thereby enable ready calibration of the voltage signal with respect to the pressure signal.

3 Claims, 3 Drawing Figures

PRESSURE TRANSDUCER

This invention relates to a pressure transducer and more particularly to a pressure transducer for converting a variable pressure signal into a variable voltage signal.

In the art of pressure transducers, there remains the need for a low-cost miniature pressure transducer that is capable of reliably converting a variable pressure signal into a variable voltage signal. For example, such a device would be particularly useful for high volume usage in microprocessor based pressure control systems such as an automotive air conditioning system wherein such a transducer could interface with a microprocessor and be utilized to control for example an engine cooling fan as well as the compressor's clutch. Moreover, it is particularly desirable that the transducer be readily calibratable both from a versatility standpoint as well as providing the precise control needed for such control functions.

The pressure transducer of the present invention is a miniature device that is manufacturable at low-cost and is readily calibratable by external manipulation rather than requiring internal access. Moreover, the device is adapted so as to be either line mounted or directly on the device whose pressure is being sensed; for example, an automotive refrigerant compressor. The device generally comprises a housing having a slot extending external thereof in which is mounted a resistance element. The resistance element is longitudinally movable in the slot and has an end portion extending outside the housing permitting such movement by external manipulation. Fixed spaced electrodes are provided which are held in engagement with a thin resistance strip at longitudinally spaced points therealong. A movable contact element is held in engagement with the resistance strip and is made movable in response to pressure with a pressure sensor over a portion of the space between the spaced electrodes. The resistance element has a high resistance portion of length less than the distance between the fixed electrodes and substantially greater than the range of movement of the movable contact and has relatively low resistance outside the high resistance portion. With the exposed end portion, the device as assembled is thus readily calibratable to adjust the voltage signal without requiring any internal adjustment with the pressure sensor and potentiometer portion. Both the pressure sensor and the potentiometer portion are of very simple design featuring a Teflon coated diaphragm and conical washer type springs in the pressure sensor and injection molded parts and wire elements in the potentiometer portion which together with the thin resistance strip are cooperatively combined with a manner to minimize the overall size of the transducer as described in more detail later.

These and other objects, advantages and features of the present invention will become more apparent from the following description and drawing in which.

Figure 1:
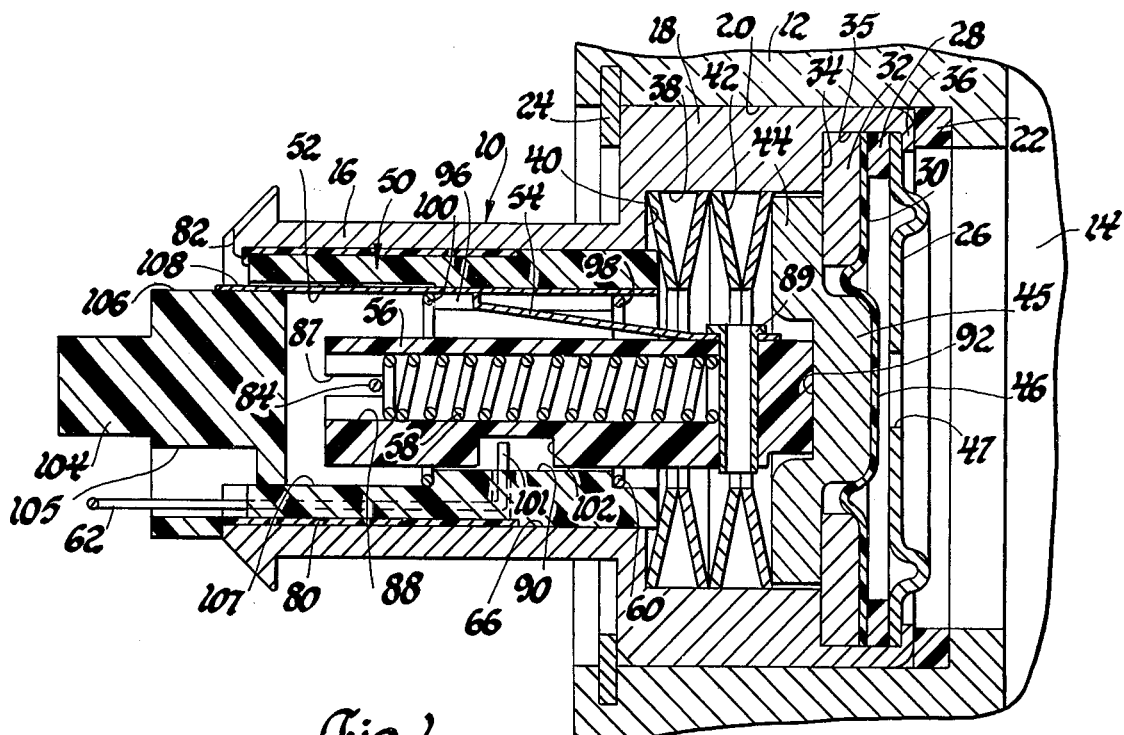
FIG. 1 is a sectional view of the preferred embodiment of the pressure transducer constructed according to the present invention installed on a refrigerant compressor.

There is shown in the drawing the preferred embodiment of the pressure transducer of the present invention generally designated as 10 as adapted for and installed in an automotive air conditioning system at the system's refrigerant compressor at the rear head 12 thereof so as to be exposed to the refrigerant discharge pressure which exists in the zone designated 14. The pressure transducer 10 comprises a generally cylindrical housing 16 of machined aluminum having a relatively large hollow cylindrical portion 18 which is formed at its outer diameter so as to be received in close fitting relationship in a hole 20 in the compressor head 12. The large diameter portion 18 houses the pressure sensor portion of the transducer and is retained in the discharge head against a seal 22 by a retainer ring 24.

The pressure sensor portion of the transducer comprises a steel disk-shaped end cover 26, a neoprene diaphragm seal 28, a Teflon-coated plastic diaphragm 30 and a steel diaphragm retainer ring 32 which are sandwiched together and retained against an annular shoulder 34 in a counterbore 35 by swaging over the outer edge 36 of the pressure sensor housing portion. A smaller counterbore 38 joins with the counterbore 35 and has an annular shoulder 40 at its inner end which provides a seat for a plurality of steel conical washer-shaped springs 42 which are series arranged and normally bias a sintered metal pressure sensor piston 44 against the diaphragm retainer 32. The piston 44 is slidably mounted in the counterbore 38 and has a central projection 45 that projects through the retainer 32 and is engaged by a roll edged central portion 46 of the diaphragm 30 which on its opposite side is exposed to the refrigerant discharge pressure through a central opening 47 in the end cover 26.

The potentiometer portion of the transducer comprises a plastic injection molded cylindrically-shaped body 50, a voltage resistor strip 52, a movable conductive spring metal wiper 54, a plastic injection molded cylindrically shaped actuator pin 56, a helical coil return spring 58 and three wire conductors; namely, a supply conductor 60, a ground conductor 62 and a control conductor 64. The potentiometer body 50 is mounted in a bore 66 in the transducer body that connects with the counterbore 38 and extends centrally through the remainder of the transducer housing to its terminal end which is the left end as viewed in FIG. 1. The three conductors 60, 62 and 64 are formed of wire to the shapes shown in FIGS. 1 and 2 so as to mount in the respective recesses 68, 70 and 72 in the exterior of the potentiometer body. The conductors each extend outward therefrom with a U-shaped portion for connection in a control circuit and are contained within the recesses as well as insulated from the metal transducer housing 16 by a cylindrical insulator sleeve 80 which is mounted therebetween, the potentiometer body 50 and sleeve 80 being retained in the transducer housing by staking the left end of the transducer housing as shown at 82. The control conductor 64 has a right angle arm 84 which extends through a radial hole 86 in the potentiometer body 50 and a transverse slot 87 in the actuator pin 56 so as to contact with as well as provide a seat for the return spring 58 that is mounted in a central hole 88 in one end of the actuator pin. The return spring 58 at its other end engages and thereby has electrical contact with a rivet 89 by which the wiper 54 is fixed to the actuator pin 56. The actuator pin is mounted for reciprocal movement in a central cylinder 90 in the potentiometer body 50 and the spring 58 by engaging the relatively stationary control connector arm 84 biases the right hand end of the actuator pin to remain in engagement with the central recessed side 92 of the pressure sensor piston 44.

The resistor strip 52 is mounted in a radially inwardly facing longitudinal slot 96 in the surface of the cylinder 90 where it is held by hoop-shaped end portions 98 and 100 of the respective conductors 60 and 62 which are insertable through holes in the potentiometer body. The conductor end portions 98 and 100 serve as fixed electrodes and are positioned so as to engage the resistance strip at longitudinally spaced points therealong outside of the path of travel of the wiper 54 which is self-biased to engage and wipe along the resistor strip. In addition, the ground conductor 62 has a right angle end portion 101 which is received in a notch 102 in the actuator pin 56 so as to retain the latter in the potentiometer body 56 as a convenient subassembly.

The left hand end of the transducer is closed by a plastic injection molded end cap 104 having apertures 105 through which the U-shaped terminal ends of the conductors extend. The end cap also has a flat 106 formed thereon that cooperates with a bore 107 in the potentiometer body to form a space through which the left hand end portion 108 of the resitor strip extends. The resistor strip's end portion 108 is thus exposed externally of the transducer to provide for calibration as will be described in more detail later.

Figure 2:
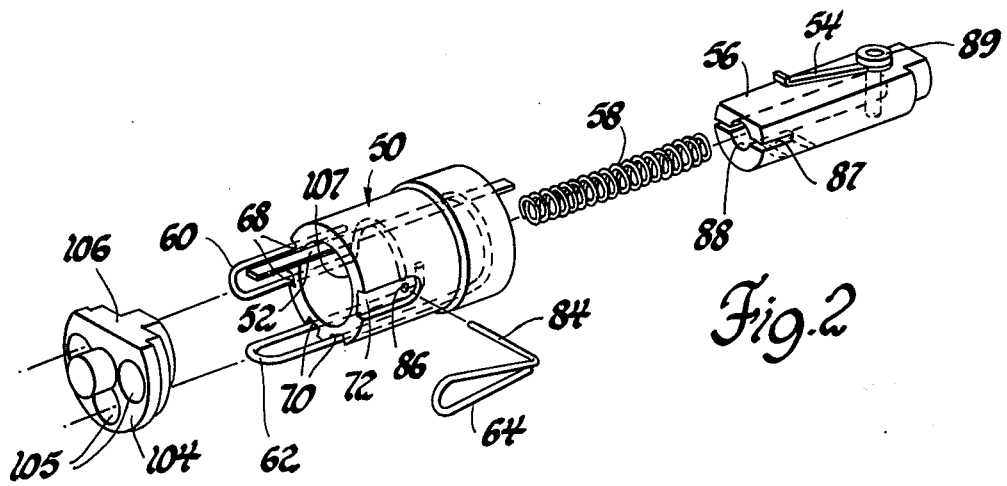
FIG. 2 is an exploded view of parts of the potentiometer portion of the pressure transducer.
Figure 3:
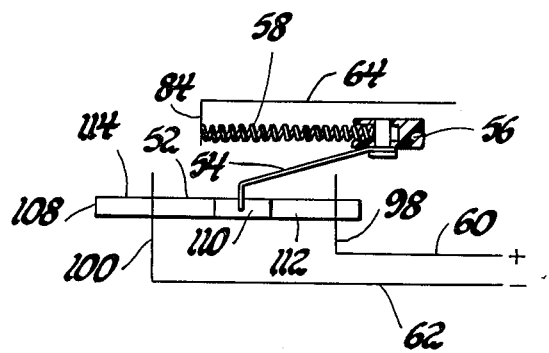
FIG. 3 is a schematic of the potentiometer portion of the pressure transducer.

The resistor strip 52 is formed of a thin plastic strip having an intermediate carbon coated portion 110 of length less than the distance between the two fixed electrodes 98 and 100 and substantially greater than the range of movement of the movable contact 54 as shown in FIGS. 1 and 3. The strip is further coated outside the resistance area at two terminal areas 112 and 114 with a highly conductive material such as silver and it is these areas which are contacted by the respective electrodes 98 and 100.

With the above described arrangement, any movement of the diaphragm's center portion 46 and thereby the piston 44 caused by a pressure change in transferred to the actuator pin 56 thereby causing the wiper 54 to move along the fixed resistor portion 110 and change the resistance value in the circuit. A predetermined voltage is conducted to the fixed resistor by the supply conductor 60 and the location of the point of contact of the wiper therewith thus determines the voltage level conducted through the control conductor 64 to an electronic controller (not shown). For example, as the wiper is moved toward the point of supply voltage, the voltage to the controller is increased in direct proportion thereto and on the other hand is reduced in the same manner by wiper travel in the reverse direction.

With the transducer fully assembled and by exposing the end portion 108 of the resistor strip 52, simple calibration of the transducer is made possible by external manipulation rather than requiring internal access to either the potentiometer and/or pressure sensor. For example, by simply applying a calibrating signal to the supply conductor and monitoring the output or control voltage at a given pressure supplied to act on the diaphragm and piston, a simple conventional tool such as pliers can be utilized to grasp the end portion 108 and adjust the resistor strip 52 longitudinally in its slot 96 until the proper control voltage is obtained, the strip being held in place following such calibration by the holding force of the two electrode portions 98 and 100.

It will also be appreciated that the arrangement of parts and in particularly the telescoping of the various members results in a very compact transducer. For example, in one actual construction the pressure transducer had small overall dimensions of less than 1.0" outside diameter and 1.5" length. Furthermore, it will be appreciated that the electrical or potentiometer portion of the assembly is confined to the pressure portion of the device by extending the body containing the piston and its return spring. This arrangement permits the entire assembly to be inserted into the compressor head shown where the discharge pressure is generated. On the other hand, the transducer of the present invention is also easily adapted to on-line mounting by simply adding a threaded member to the pressure side of the housing.

The above described preferred embodiment is illustrative of the invention which may be modified within the scope of the appended claims.

The embodiments of the invention in which an exclusive property or privilege is claimed are defined as follows:

1. In a pressure transducer adapted for communication with a pressure system producing a variable pressure signal wherein the transducer has a potentiometer including a resistor connectable with a supply conductor and a ground conductor and a relatively movable conductive wiper connectable with a control conductor and a pressure sensor responsive to the variable pressure signal to move the wiper along the resistor so as to convert the variable pressure signal into a variable voltage signal: the improvement comprising the resistor being in the form of a strip having a resistance portion located intermediate two terminal portions, and resistor mounting means for mounting the strip in the transducer so that the terminal portions remain in conductive relationship in the potentiometer for connection with the supply conductor and ground conductor while the strip is slidably adjustable external of the transducer to adjust the resistance portion relative to the wiper to thereby enable ready calibration of the voltage signal with respect to the pressure signal without entering the transducer.

2. A pressure transducer effective to convert a pressure signal into a voltage signal and subject to calibration by external manipulation comprising in combination: a housing having a slot extending exterior thereof, a resistance strip mounted for longitudinal movement in said slot, said resistance strip having an end portion extending outside said housing to permit longitudinal movement by external manipulation of said end portion, fixed spaced electrodes in engagement with said resistance strip at longitudinally spaced points therealong so as to releasably hold said resistance strip in place, a movable contact element in engagement with said resistance strip movable in response to pressure over a portion of the space between said spaced electrodes, said resistance element having a high resistance portion between said fixed electrodes engaged by said movable contact element and substantially greater than the range of movement of said movable contact and heating relatively low resistance portions outside said high resistance portion engaged by said fixed electrodes.

3. A pressure transducer effective to produce a voltage substantially proportional to a pressure and subject to calibration by external manipulation comprising in combination: a housing having a slot extending exterior thereof, a resistance element mounted for longitudinal movement in said slot, said resistance element having an end portion extending outside said housing to permit longitudinal movement by external manipulation of side end portion, fixed spaced electrodes in engagement with said resistance element at longitudinally spaced points therealong, a movable contact element in engagement with said resistance element movable in response to pressure over a portion of the space between said spaced electrodes, said resistance element having a high resistance portion engaged by said movable contact element of length less than the distance between said fixed electrodes and substantially greater than the range of movement of said movable contact element and having relatively low resistance portions outside said high resistance portion engaged by said fixed electrodes.

* * * * *

UNITED STATES PATENT AND TRADEMARK OFFICE
CERTIFICATE OF CORRECTION

PATENT NO. : 4,433,321

DATED : February 21, 1984

INVENTOR(S) : Richard E. Widdowson

It is certified that error appears in the above—identified patent and that said Letters Patent is hereby corrected as shown below:

Column 1, line 56, "with" should read -- in --.

Column 4, line 61, claim 2, "heating" should read -- having --.

Signed and Sealed this

Fourth Day of September 1984

[SEAL]

Attest:

GERALD J. MOSSINGHOFF

Attesting Officer

Commissioner of Patents and Trademarks